Patented May 26, 1936

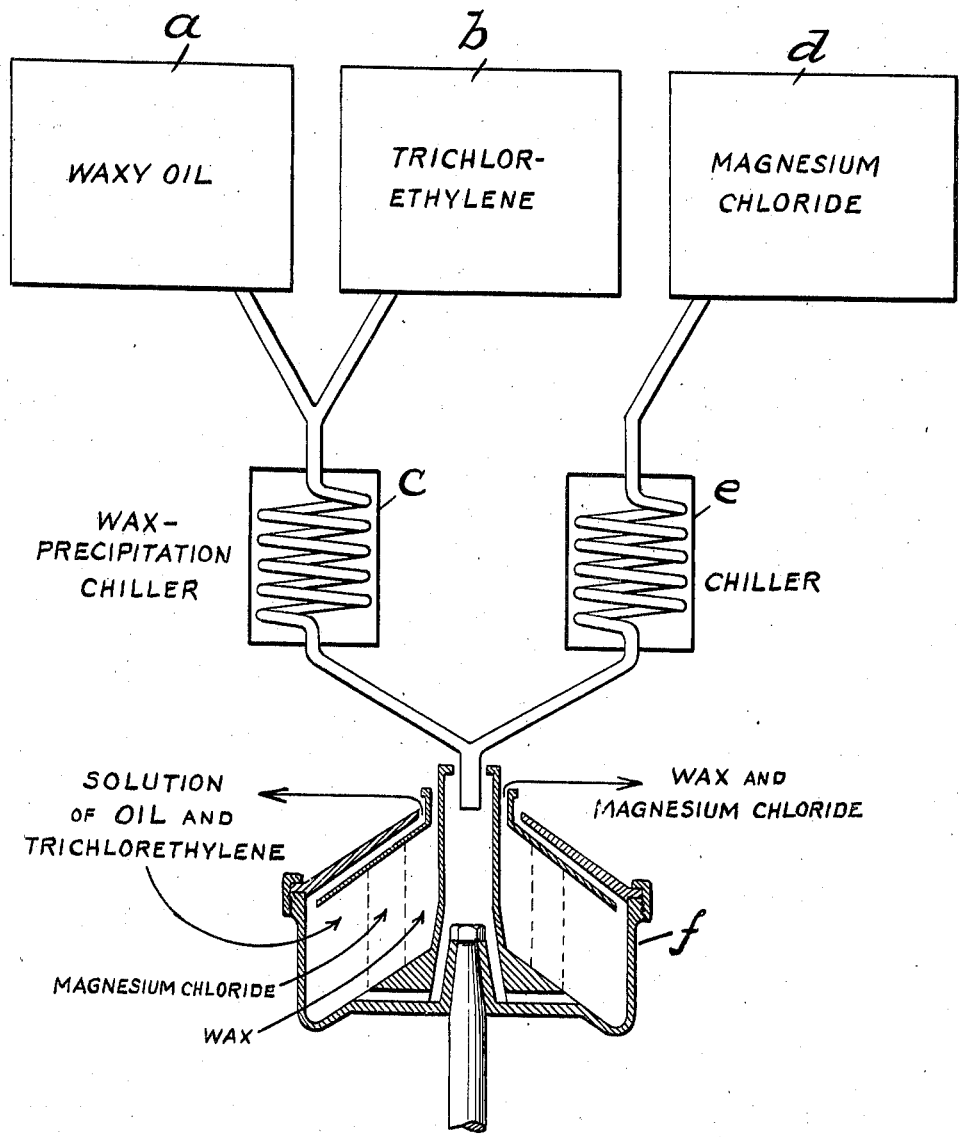

2,041,885

UNITED STATES PATENT OFFICE 2,041,885

METHOD OF DEWAXING MINERAL OILS

Henri Walch, Paris, France, assignor to Aktiebolaget Separator-Nobel, Stockholm, Sweden, a corporation of Sweden Application September 5, 1934, Serial No. 742,764
In Germany September 29, 1933

14 Claims. (Cl. 196—19)

As is well known the mineral oils (distillates or residues) which are used as raw material in the production of lubricating oils are generally more or less dewaxed in order to obtain a sufficiently low solidification point of the oil. In most cases the dewaxing takes place after dilution and chilling of the oil in filter presses or centrifugal separators.

If the dewaxing is carried out with centrifuges the diluting agent (dissolving agent) may either be heavier or lighter than the wax to be removed. As heavier dissolving agents, trichlorethylene, dichlorethane and the like may be used. Where heavier dissolving agents are employed the solution of oil and dissolving agent is discharged from the heavier liquid outlet of the centrifuge, while the separated wax, together with some of the dissolving agent and some of the oil, are discharged from the lighter liquid outlet of the centrifuge. From both separated constituents the dissolving agent is subsequently recovered by distillation. A description of this process is to be found in the Backlund Patent No. 1,676,069, issued July 3, 1928.

As will be understood from the foregoing, it cannot be avoided that the wax obtained in this way shall contain some oil, as unless it were more or less diluted with the solution of oil and dissolving agent it would not have sufficient fluidity to discharge from the bowl. The loss of oil thus incurred generally amounts to several percent of the treated quantity of oil and therefore greatly impairs the productiveness and economy of the dewaxing process.

The object of the present invention is to avoid or substantially reduce the said losses of oil and thus to increase the yield of oil to a corresponding degree.

The invention thus relates to the known process of dewaxing mineral oils by mixing with a dissolving agent of higher specific gravity than the heaviest wax to be removed, chilling and centrifuging, and is characterized by the fact that a liquid of higher specific gravity than the lightest wax to be removed and of lower specific gravity than the solution of oil in the dissolving agent and which is insoluble in the dissolving agent and the oil, is fed, simultaneously with the oil to be dewaxed, into the centrifugal bowl, and discharges from it substantially together with the wax.

The supply of a liquid of this kind into the bowl together with the oil makes it possible to obtain the wax in sufficiently fluid form to enable continuous discharge from the bowl, without the wax containing appreciable amounts of oil and dissolving agent. Under the influence of the centrifugal force within the bowl the said liquid separates from the solution of oil and dissolving agent and moves inwards in the bowl together with the wax. Any of the oil and dissolving agent that would otherwise be carried off by the wax is thereby displaced by the liquid, which forms an easily fluid mixture with the wax and discharges with it continuously from the central part of the separator bowl, while the solution of oil and dissolving agent flows out as the heavier component through the heavier liquid discharge outlet.

As examples of suitable liquids may be mentioned water solutions of calcium chloride and magnesium chloride, alcohol, glycerine, etc. For instance, a 22% calcium chloride solution has a specific weight of 1.2 and a freezing point of about —23° C. A 19% magnesium chloride solution has a specific weight of 1.17 and a freezing point of —30° C. In case the oil to be dewaxed is dissolved in trichlorethylene in the volume relation 35:65 and chilled to —20° C., the said calcium chloride solution may be used, as the solution of oil and trichlorethylene has a specific gravity of about 1.27 and consequently is heavier than the liquid. If the oil to be dewaxed is dissolved in the same organic compounds in the volume relation 45:55 and chilled to —27° C. the said solution of magnesium chloride may be used.

To practice the process it is not necessary to modify the centrifugal bowls heretofore used. In case the added liquid has a tendency to form a strong emulsion with the oil, it may be advisable to supply the liquid separately to the bowl, in order to facilitate the operation of the bowl and to avoid a too strong emulsion. But in other cases it may be advantageous to mix the solution of oil and dissolving agent intimately with the liquid, and possibly also to add an emulsifying agent, before it is fed into the separator.

The mixture or the emulsion of wax and liquid may easily be separated by heating or other methods after the dewaxing has been effected.

The desirable amount of the added liquid should vary directly with the content of wax in the oil. For instance, with an oil containing about 5% of wax, it has proved sufficient to add a quantity of calcium chloride solution corersponding to 5–10% of the volume of oil and oil-dissolving agent. In general, the suitable percentage varies between 2 and 50%.

It is advisable to separately chill the liquid before it is added to the oil solution, whether it be added thereto before centrifuging or whether it be added thereto in the centrifugal bowl; but it is permissible, also, to first mix the liquid with the solution and then chill.

The drawing is a diagrammatic view of an apparatus for practicing the process.

The oil in tank $a$ which is to be dewaxed and the heavy solvent, e. g., trichlorethylene, in tank $b$ are mixed and chilled in chiller $c$ to the temperature required to precipitate the wax. From tank $d$ the added liquid, e. g. magnesium chloride, of lower specific gravity than the solution of oil and heavy solvent, is, preferably, chilled separately in chiller $e$ and, together with the mixture of heavy oil solution and wax, flow to the centrifugal separator bowl $f$. Therein the heavy oil solution goes to the periphery and the wax toward the axis of rotation, while the added liquid, which tends to occupy a median zone, displaces any of the heavy oil solution that would otherwise be carried off by the wax. The outlets are so adjusted that the heavy oil solution discharges from the heavy liquid discharge outlet, while the added liquid assists in discharging the wax and flows with it out of the light liquid discharge outlet. The process is preferably carried on in a continuous manner.

What I claim and desire to protect by Letters Patent is:

1. In the process of dewaxing mineral oil in which there is added to the oil an oil dissolving agent having a specific gravity higher than that of the heaviest wax constituent of the oil and which is relatively soluble with the oil and is relatively not soluble with the wax and forms with the oil a solution substantially heavier than the wax and in which the mixture is chilled and centrifuged; the modification which comprises adding to the mixture and centrifuging with it another liquid which is relatively insoluble in, and of substantially lower specific gravity than, the heavy solution of oil and dissoving agent and which, in the centrifugal operation, functions to assist in displacing said heavy solution from the wax and in expelling the light separated wax from the locus of centrifugation, whereby the loss of oil with the wax is substantially reduced.

2. The process set forth in claim 1 in which the added liquid is so substantially insoluble in the solution of oil and dissolving agent and is of such substantially lower specific gravity than the oil that all or most of it discharges with the wax.

3. The process set forth in claim 1 in which the added liquid is of substantially higher specific gravity than the specific gravity of the lightest wax constituent of the oil.

4. The process set forth in claim 1 in which the added liquid has a specific gravity above that of the heaviest wax constituent.

5. The process set forth in claim 1 in which the added liquid has a freezing point substantially below the temperature to which the mixture to be centrifuged is chilled to precipitate the wax.

6. The process set forth in claim 1 in which the added liquid is a salt water solution.

7. The process set forth in claim 1 in which the added liquid is a water solution of magnesium chloride.

8. The process set forth in claim 1 in which the added liquid is an alcohol solution.

9. The process set forth in claim 1 in which the added liquid has a freezing point of not over —20° C.

10. The process set forth in claim 1 in which, before centrifuging, the added liquid and the solution of oil and dissolving agent are separately chilled.

11. The process set forth in claim 1 in which, before centrifuging, the added liquid is mixed with the solution of oil and dissolving agent and the mixture chilled.

12. The process set forth in claim 1 in which the added liquid and the solution of oil and dissolving agent are separately fed to the locus of centrifugation.

13. The process set forth in claim 1 in which the added liquid is recovered from the separated wax and is re-used in the process.

14. The process set forth in claim 1 in which the volume of the said added liquid is between two and fifty per cent. of the volume of the said solution.

HENRI WALCH.